US012770815B2

(12) United States Patent
Chen et al.

(10) Patent No.: US 12,770,815 B2
(45) Date of Patent: Oct. 20, 2026

(54) ELECTROMAGNETIC RELAY

(71) Applicant: Tyco Electronics (Shanghai) Co., Ltd., Shanghai (CN)

(72) Inventors: Jun (Tod) Chen, Shenzhen (CN); Hailin (Timothy) Chen, Shenzhen (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 197 days.

(21) Appl. No.: 18/343,047

(22) Filed: Jun. 28, 2023

(65) Prior Publication Data

US 2023/0420206 A1 Dec. 28, 2023

(30) Foreign Application Priority Data

Jun. 28, 2022 (CN) ......................... 202210752236.5

(51) Int. Cl.
*H01H 50/02* (2006.01)
*H01H 50/54* (2006.01)

(52) U.S. Cl.
CPC ............ *H01H 50/54* (2013.01); *H01H 50/02* (2013.01)

(58) Field of Classification Search
CPC ............................. H01H 50/02; H01H 50/642
USPC .................................................. 335/202, 129
See application file for complete search history.

(56) References Cited

U.S. PATENT DOCUMENTS 4,177,439 A * 12/1979 Smith .................. H01H 51/281 29/622
5,160,910 A * 11/1992 Tsuji .................... H01H 50/642 335/121
5,278,531 A * 1/1994 Link ...................... H01H 9/342 335/8
6,107,903 A * 8/2000 Sako .................... H01H 51/229 335/78
6,236,575 B1 * 5/2001 Ritter ................... H01H 50/305 439/271
6,252,478 B1 * 6/2001 Gruner ................... H01H 50/54 335/83
6,549,108 B2 * 4/2003 Fausch ................. H01H 50/642 335/130
6,906,604 B1 * 6/2005 Mader .................. H01H 50/642 335/128
7,504,915 B2 * 3/2009 Takayama ............. H01H 50/24 335/131
7,705,700 B2 * 4/2010 Parker .................... H01H 50/34 335/185

(Continued)

*Primary Examiner* — Alexander Talpalatski
(74) *Attorney, Agent, or Firm* — Barley Snyder

(57) ABSTRACT

An electromagnetic relay includes a housing, an insulator, static terminals, and movable terminals. The housing has a top wall and a bottom opening that are opposite in a height direction, a front sidewall and a rear sidewall that are opposite in a front and rear direction, and a left sidewall and a right sidewall that are opposite in a left-right direction. The insulator is arranged in the housing and is formed with a plurality of chambers which are opened towards the front sidewall and are arranged in a row along the left-right direction. The insulator includes a partition plate located between two adjacent chambers. The static terminals are fixedly arranged in respective ones of the plurality of chambers. The movable terminals are arranged in respective ones of the plurality of chambers and are adapted to electrically contact the static terminals.

19 Claims, 12 Drawing Sheets

(56) References Cited

U.S. PATENT DOCUMENTS

| | | | | |
|---|---|---|---|---|
| 8,487,724 | B2 * | 7/2013 | Fleege | H01H 71/125 335/8 |
| 9,761,382 | B2 * | 9/2017 | Stanton | H01H 1/5822 |
| 11,462,378 | B2 * | 10/2022 | Sedeño Merchán | H01H 50/24 |
| 12,154,740 | B2 * | 11/2024 | Horiuchi | H01H 9/04 |
| 2001/0045878 | A1 * | 11/2001 | Fausch | H01H 50/026 335/129 |
| 2002/0050885 | A1 * | 5/2002 | Gruner | H01H 1/26 335/129 |
| 2013/0222084 | A1 * | 8/2013 | Kato | H01H 50/043 335/189 |
| 2013/0249657 | A1 * | 9/2013 | Horii | H01H 50/04 335/202 |
| 2014/0253269 | A1 * | 9/2014 | Yamauchi | H01H 50/02 335/202 |
| 2023/0079711 | A1 * | 3/2023 | Ziegler | H01H 47/002 335/185 |

* cited by examiner

ELECTROMAGNETIC RELAY

CROSS-REFERENCE TO RELATED APPLICATIONS

This application claims the benefit of Chinese Patent Application No. CN202210752236.5 filed on Jun. 28, 2022, in the State Intellectual Property Office of China, the whole disclosure of which is incorporated herein by reference.

FIELD OF THE INVENTION

The present invention relates to an electromagnetic relay, in particular to an electromagnetic relay for multiphase circuits.

BACKGROUND

An electromagnetic relay for multiphase circuits typically includes a housing, an insulator, multiple electric arc isolation plates, multiple movable terminals, and multiple static terminals. The insulator is installed in the housing and includes an inner cavity formed therein. The plurality of electric arc isolation plates are installed in the insulator to divide the inner cavity of the insulator into a plurality of chambers. The movable terminal and the static terminal are installed in each chamber. However, in these devices, the arc separation plate occupies space in the chamber, resulting in a reduction in the opening distance between the movable contact of the movable terminal and the static contact of the static terminal, which is prone to arcing erosion. In addition, the manufacture of electric arc isolation plates requires the use of separate molds, which can lead to increased costs and complex assembly of electric arc isolation plates.

In addition, each movable terminal of the relay includes a fixed terminal and a U-shaped movable elastic piece. The fixed terminal is fixed to the insulator and cannot be moved. The movable elastic piece comprises a fixed end fixed to the fixed terminal and a cantilever portion extending from the fixed end. The cantilever portion of the movable elastic piece faces the body portion of the fixed terminal. When a short circuit current passes through the cantilever portion of the movable elastic piece and the body portion of the fixed terminal, the current directions on the fixed terminal and the movable elastic piece are opposite, which generates electrical force between the fixed terminal and the movable elastic piece. When a short circuit current passes through a closed movable contact, a strong current contraction produces a large Holm force that drives the movable contact to separate from the static contact. The direction of the electric force generated by the aforementioned opposite currents and the elastic force of the armature connection spring piece is the same but opposite to the Holm force to resist the Holm force together. This prevents the closed movable contact from springing back and breaking from the static contact. However, in prior art devices, the spacing between the movable elastic piece of the U-shaped structure and the fixed terminal is relatively large, and the effective length of the movable elastic piece of the U-shaped structure is relatively small, which can lead to relatively small electrical force generated and insufficient resistance to the Holm force. This creates a risk of rebound and disconnection of the movable contact.

SUMMARY

According to an embodiment of the present disclosure, an electromagnetic relay includes a housing, an insulator, a plurality of static terminals, and a plurality of movable terminals. The housing has a top wall and a bottom opening that are opposite in a height direction, a front sidewall and a rear sidewall that are opposite in a front and rear direction, and a left sidewall and a right sidewall that are opposite in a left-right direction. The insulator is arranged in the housing and formed is with a plurality of chambers which are opened towards the front sidewall of the housing and are arranged in a row along the left-right direction. The insulator includes a partition plate located between two adjacent chambers. The plurality of static terminals are fixedly arranged in respective ones of the plurality of chambers of the insulator. The plurality of movable terminals are arranged in respective ones of the plurality of chambers and are adapted for electrical contact with the plurality of static terminals.

BRIEF DESCRIPTION OF THE DRAWINGS

The invention will now be described by way of example with reference to the accompanying Figures, of which.

DETAILED DESCRIPTION OF THE EMBODIMENTS

Figure 1:
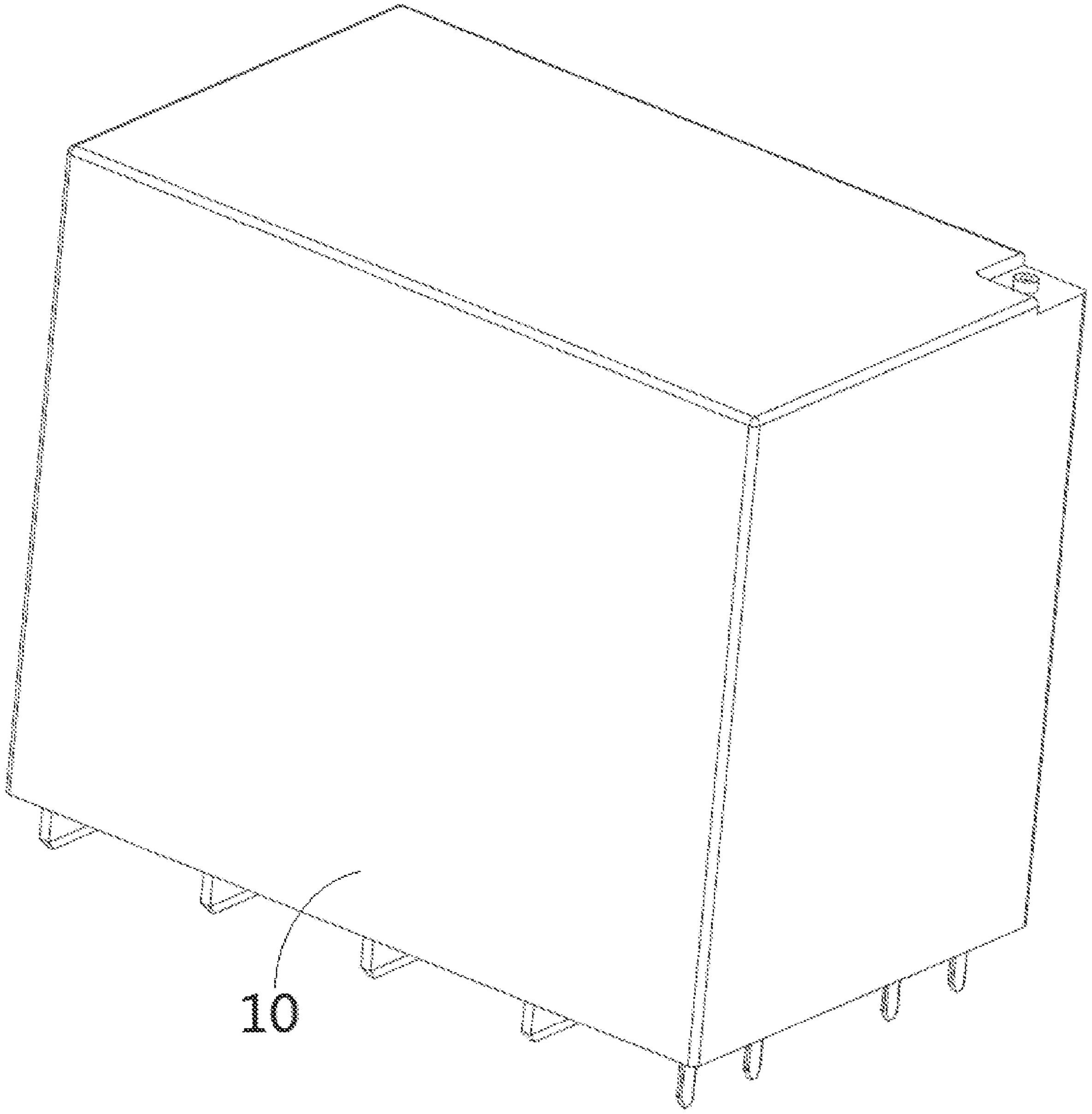
FIG. 1 shows an illustrative perspective view of an electromagnetic relay according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, an electromagnetic relay includes a housing having a top wall and a bottom opening that are opposite in a height direction, a front sidewall and a rear sidewall that are opposite in a front and rear direction, and a left sidewall and a right sidewall that are opposite in a left-right direction. The relay further includes an insulator housed in the housing and formed with a plurality of chambers which are opened towards the front sidewall of the housing and are arranged in a row along the left-right direction. A plurality of static terminals are fixedly installed in the plurality of chambers of the insulator, and a plurality of movable terminals are respectively installed in the plurality of chambers for electrical contact with the plurality of static terminals. The insulator has a partition plate located between two adjacent chambers, and a rib is formed on the inner wall surface of the front sidewall of the housing. The front side of the partition plate is positioned against the inner wall surface of the front sidewall of the housing, and a side of the rib is positioned against the left or right side of the partition plate to electrically isolate the adjacent two chambers from each other.

Figure 2:
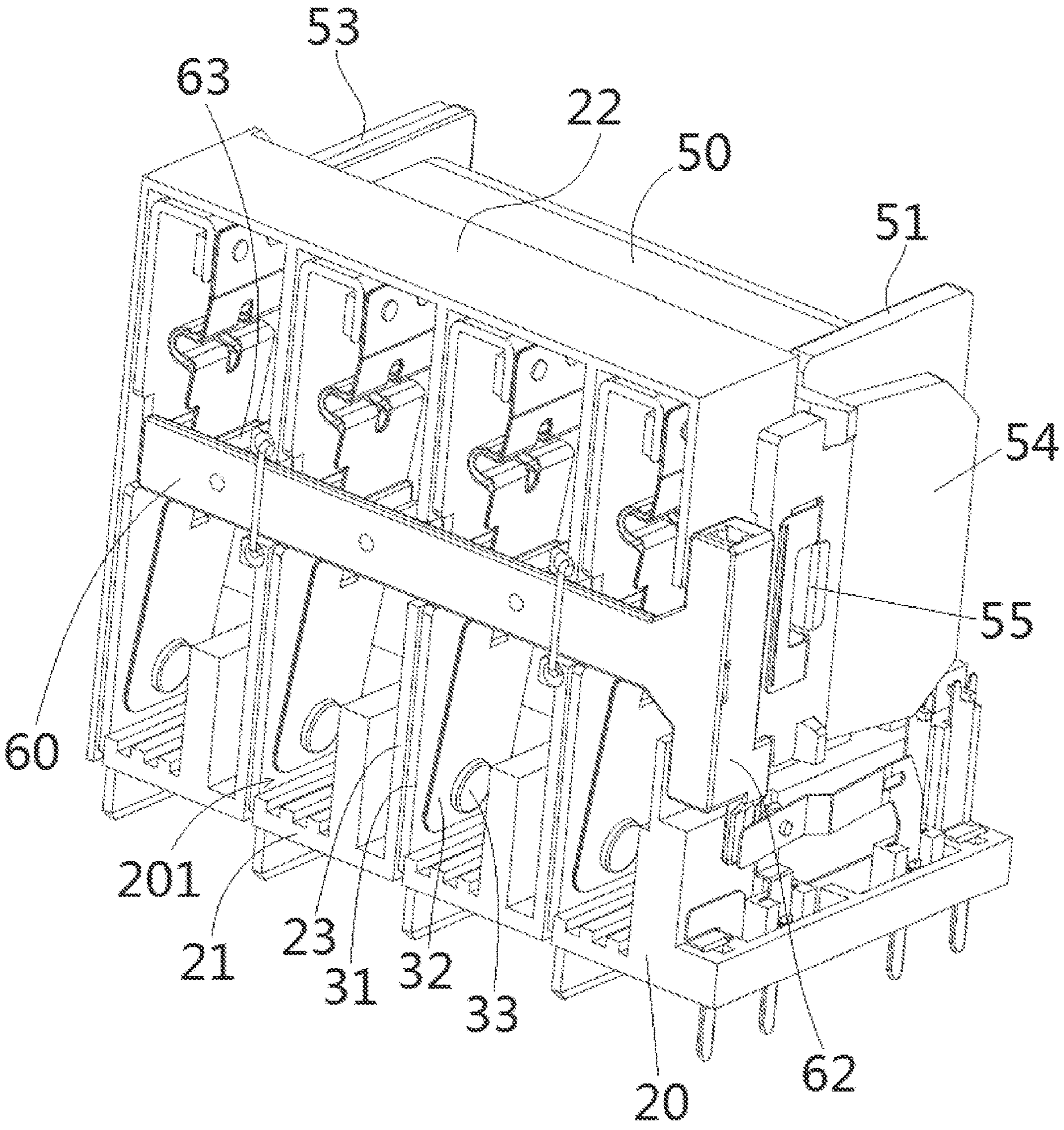
FIG. 2 shows an illustrative perspective view of an electromagnetic relay according to an exemplary embodiment of the present invention when viewed from the right, with the housing removed.
Figure 3:
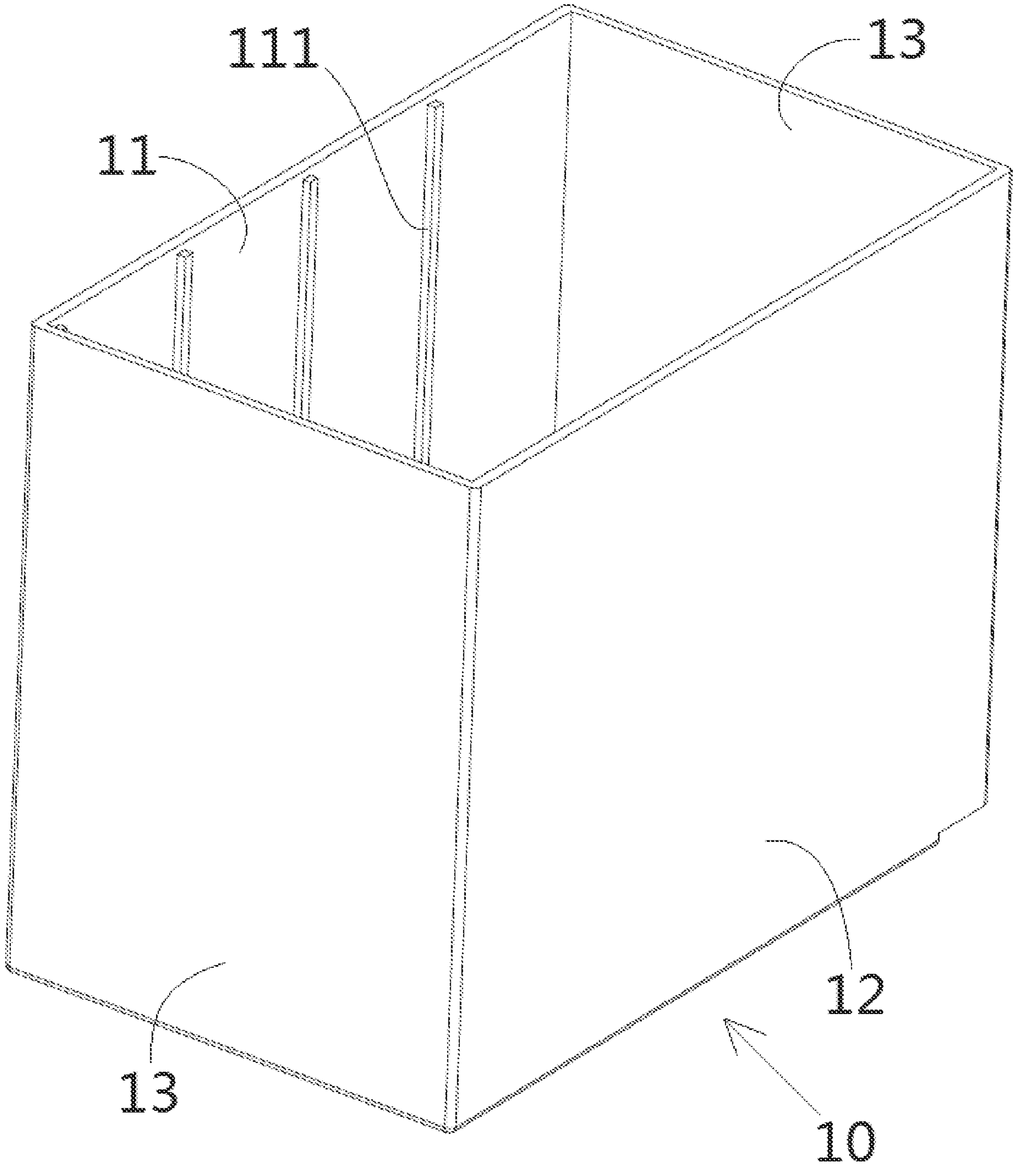
FIG. 3 shows an illustrative perspective view of an electromagnetic relay housing according to an exemplary embodiment of the present invention when viewed from the bottom.
Figure 4:
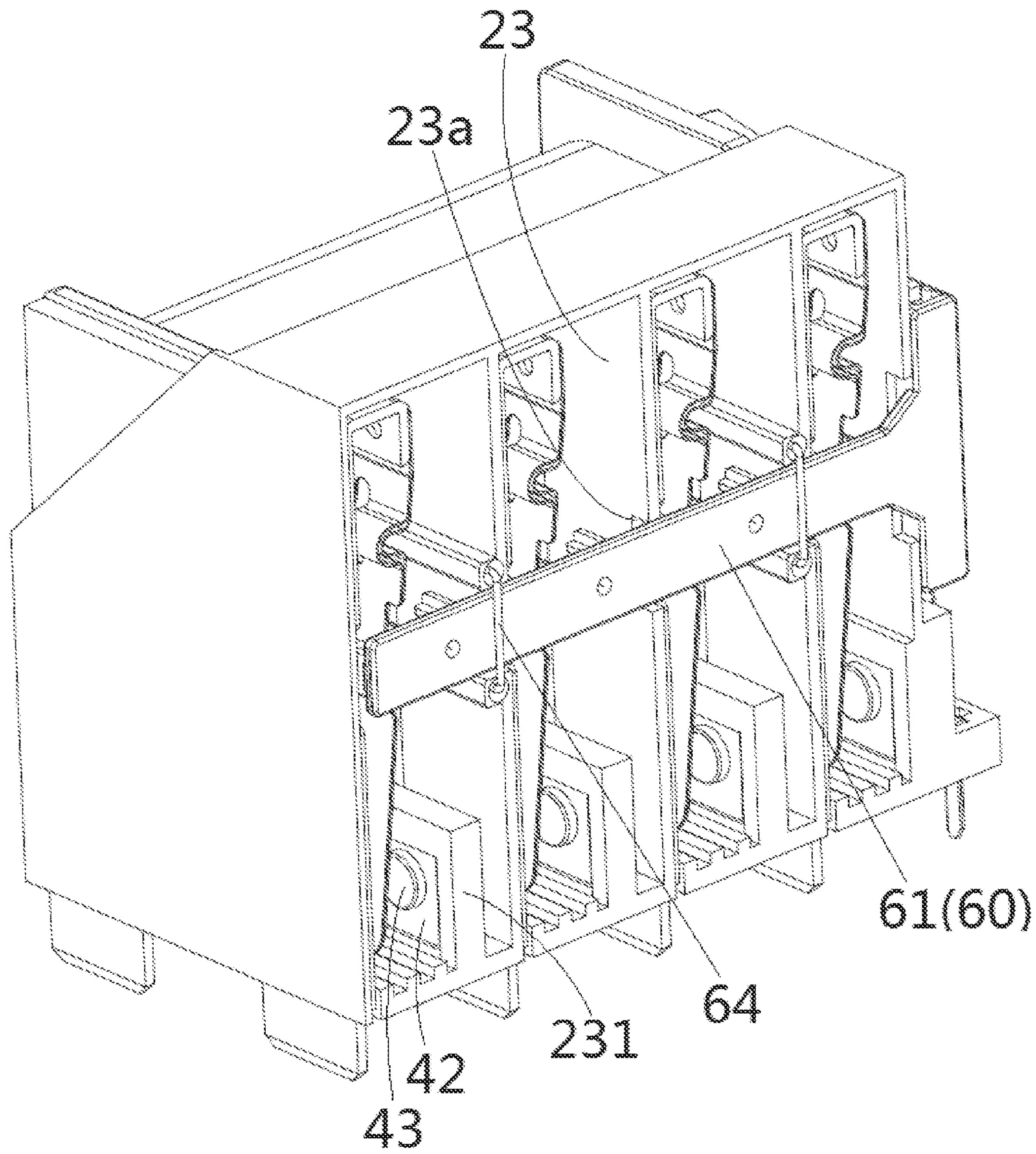
FIG. 4 shows an illustrative perspective view of an electromagnetic relay according to an exemplary embodiment of the present invention when viewed from the left, with the housing removed.
Figure 6:
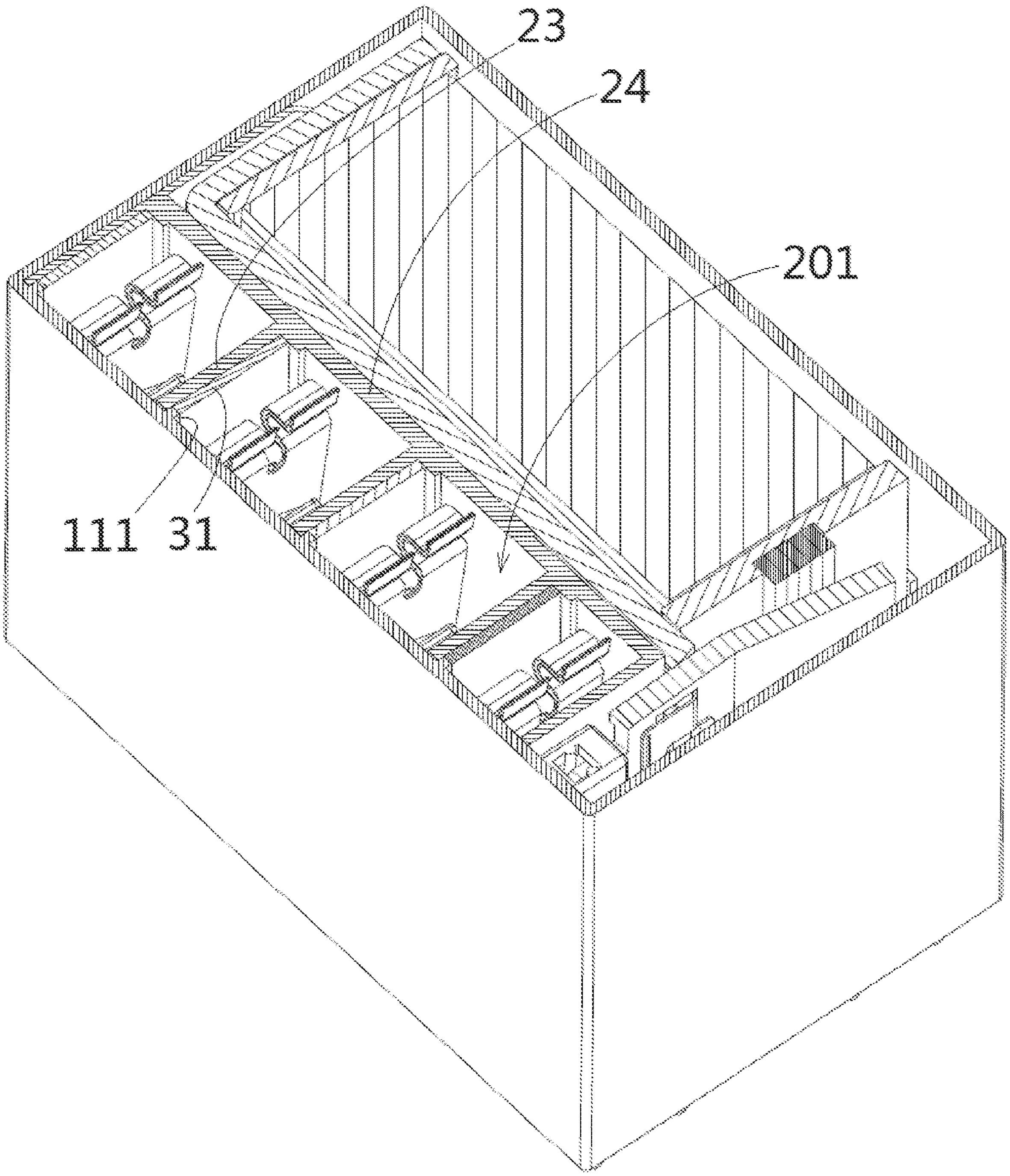
FIG. 6 shows a cross-sectional view of an electromagnetic relay according to an exemplary embodiment of the present invention.

FIG. 1 shows an illustrative perspective view of an electromagnetic relay according to an exemplary embodiment of the present invention. FIG. 2 shows an illustrative perspective view of an electromagnetic relay according to an exemplary embodiment of the present invention when viewed from the right, with a housing 10 thereof removed. FIG. 3 shows an illustrative perspective view of the electromagnetic relay housing 10 according to an exemplary embodiment of the present invention when viewed from the bottom. FIG. 4 shows an illustrative perspective view of an electromagnetic relay according to an exemplary embodiment of the present invention when viewed from the left, with the housing 10 removed. FIG. 6 shows a cross-sectional view of an electromagnetic relay according to an exemplary embodiment of the present invention.

As shown in FIGS. 1-4 and 6, in the illustrated embodiment, the electromagnetic relay includes the housing 10, an insulator 20, a plurality of movable terminals 3, and a plurality of static terminals 4. The housing 10 has a top wall and a bottom opening that are opposite in the height direction, a front sidewall 11 and a rear sidewall 12 that are opposite in the front-rear direction, and a pair of lateral sidewalls 13, or a left sidewall and a right sidewall, which are opposite in the left-right direction. The insulator 20 is housed in the housing 10 and formed with a plurality of chambers 201. The plurality of chambers 201 are arranged in a row in the left-right direction. Each chamber 201 has a front opening that opens towards the front sidewall 11 of the housing 10. The plurality of static terminals 4 are fixedly installed in respective ones of the plurality of chambers 201 of the insulator 20. The plurality of movable terminals 3 are installed in respective ones of the plurality of chambers 201 for electrical contact with the plurality of static terminals 4.

The insulator 20 has a partition plate 23 located between two adjacent chambers 201. A rib 111 is formed on the inner wall surface of the front sidewall 11 of the housing 10. The front side of the partition plate 23 is arranged against the inner wall surface of the front sidewall 11 of the housing 10, and the side surface of the rib 111 is arranged against the left or right side surface of the partition plate 23 to electrically isolate the two adjacent chambers 201 from each other. In the illustrated embodiment, the side surface of the rib 111 abuts against the left side surface of the partition plate 23.

Figure 7:
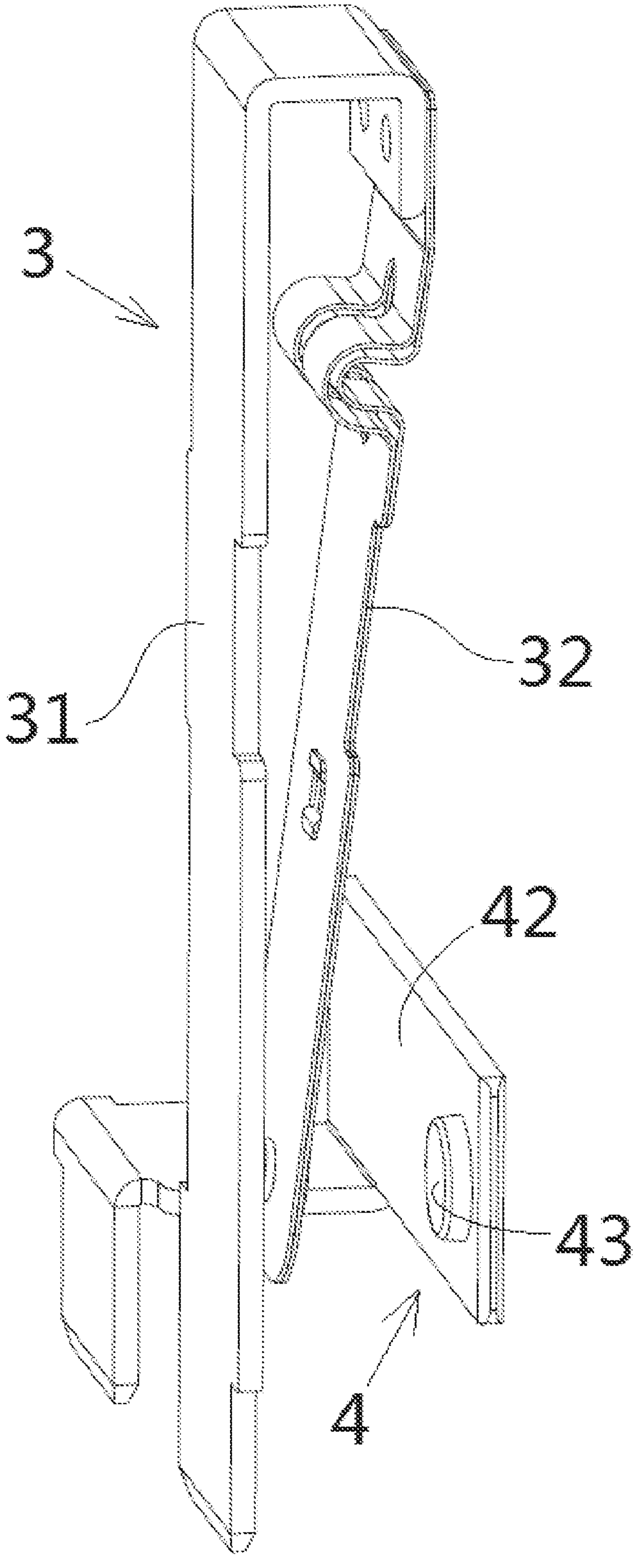
FIG. 7 shows an illustrative perspective view of a movable terminal and a static terminal of an electromagnetic relay according to an exemplary embodiment of the present invention, wherein the movable terminal and the static terminal are in a separate state.
Figure 8:
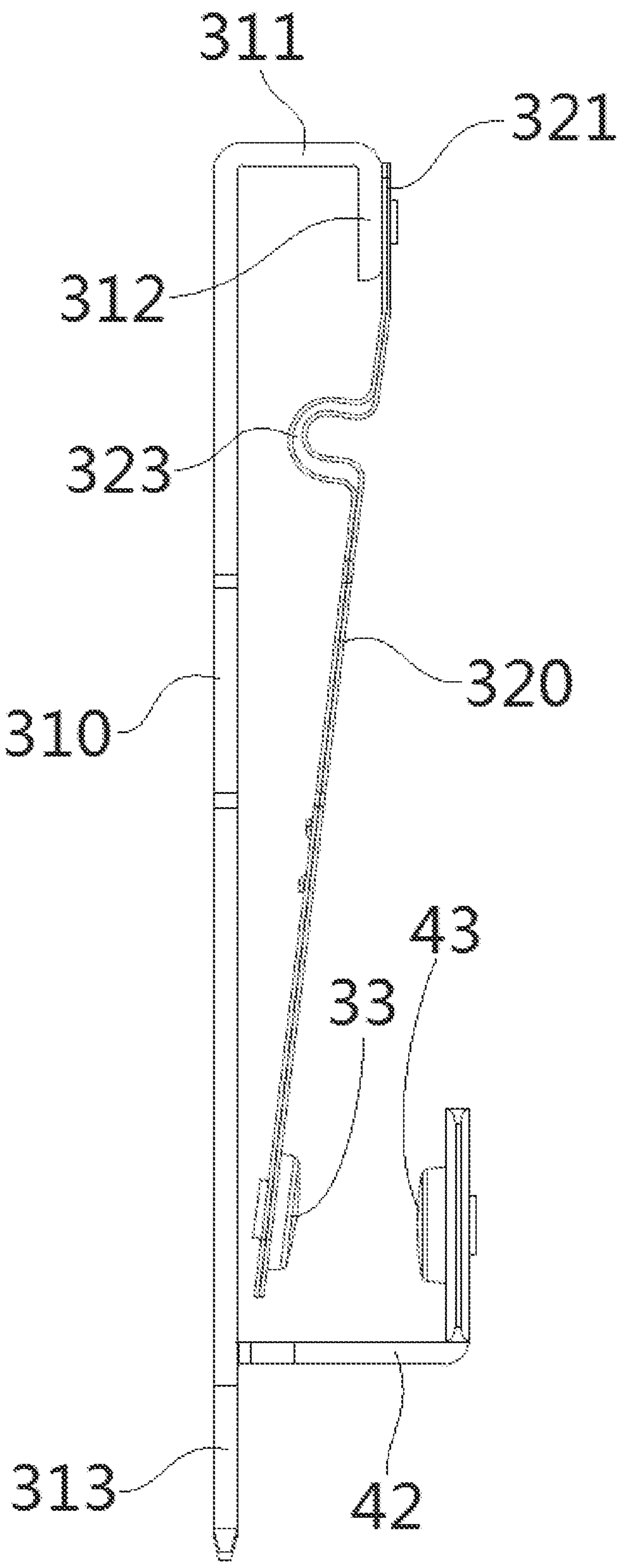
FIG. 8 shows a side view of a movable terminal and a static terminal of an electromagnetic relay according to an exemplary embodiment of the present invention.
Figure 9:
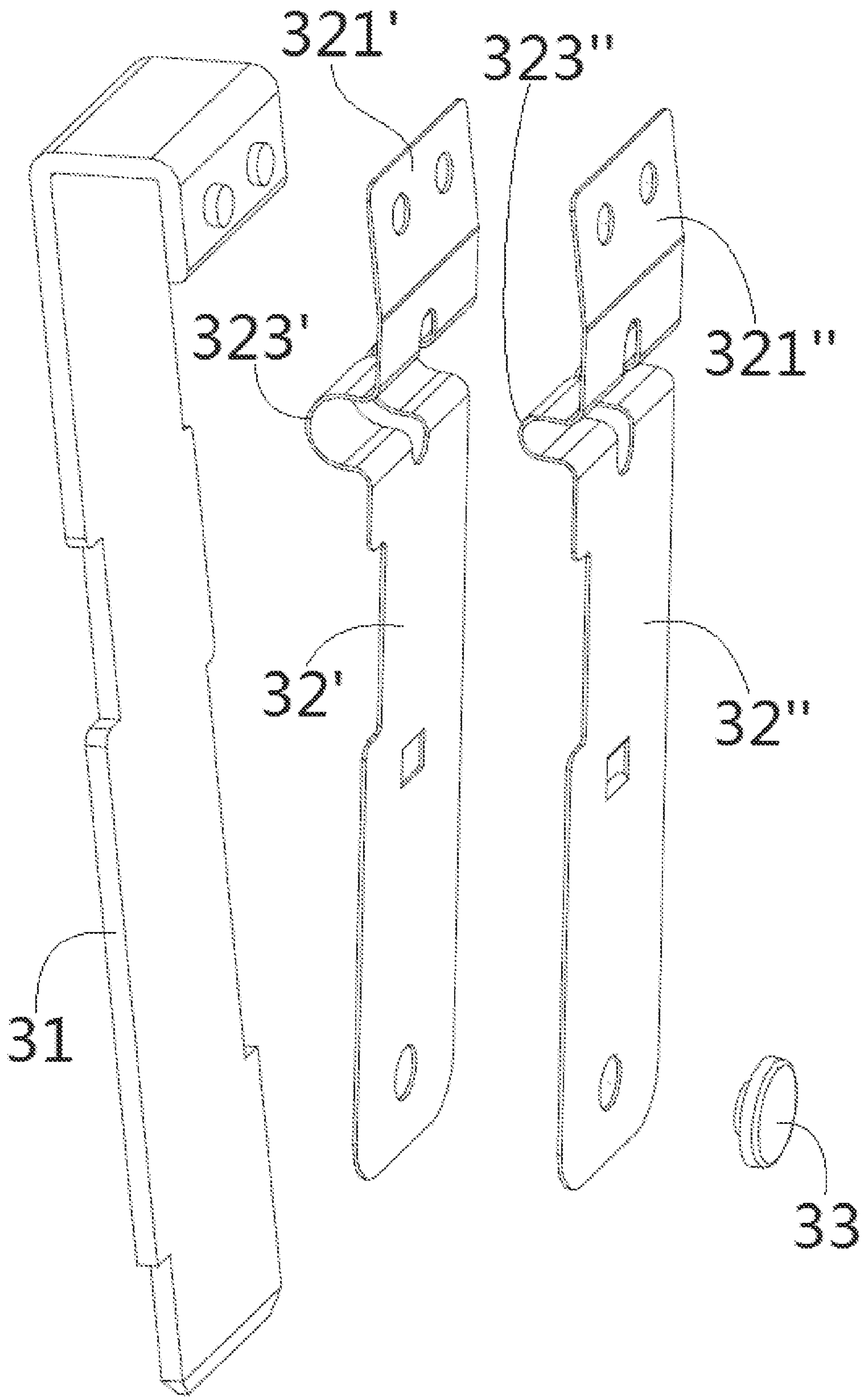
FIG. 9 shows an illustrative exploded view of a movable terminal of an electromagnetic relay according to an exemplary embodiment of the present invention.
Figure 10:
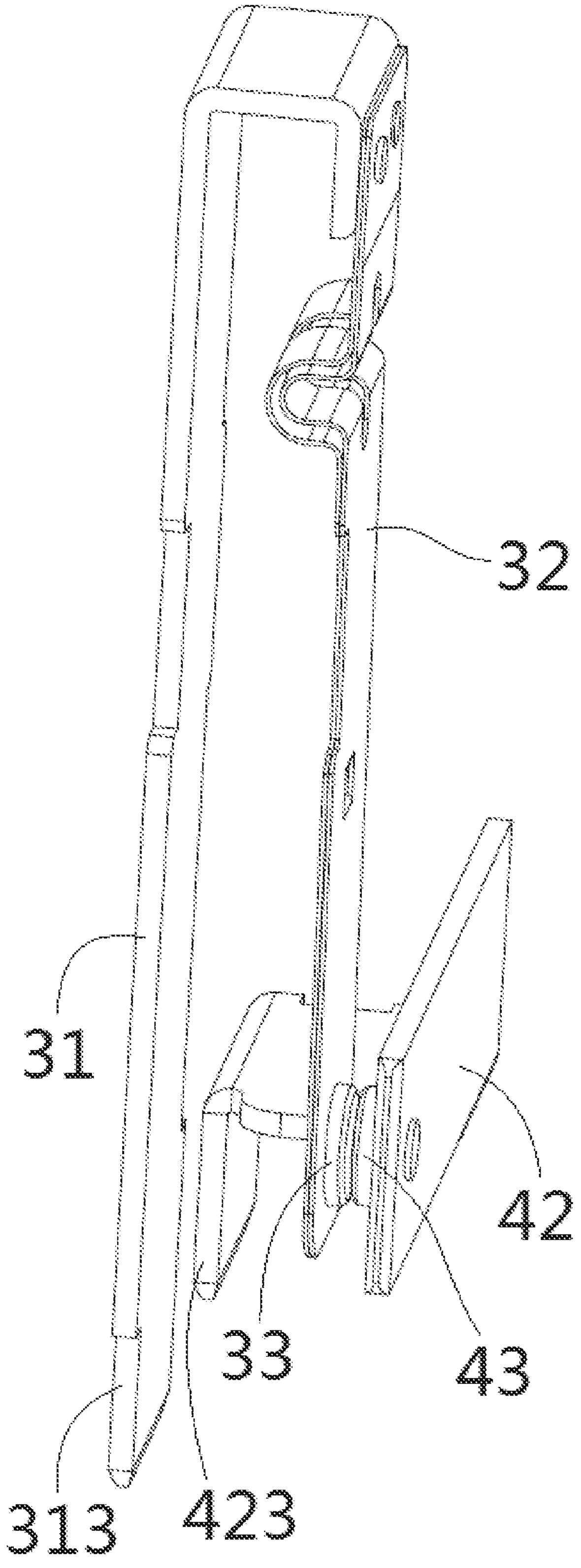
FIG. 10 shows an illustrative perspective view of a movable terminal and a static terminal of an electromagnetic relay according to an exemplary embodiment of the present invention, wherein the movable terminal and the static terminal are in an electrical contact state.

FIG. 7 shows an illustrative perspective view of a movable terminal 3 and a static terminal 4 of an electromagnetic relay according to an exemplary embodiment of the present invention, wherein the movable terminal 3 and the static terminal 4 are in a separate state. FIG. 8 shows a side view of a movable terminal 3 and a static terminal 4 of an electromagnetic relay according to an exemplary embodiment of the present invention. FIG. 9 shows an illustrative exploded view of a movable terminal 3 of an electromagnetic relay according to an exemplary embodiment of the present invention. FIG. 10 shows an illustrative perspective view of a movable terminal 3 and a static terminal 4 of an electromagnetic relay according to an exemplary embodiment of the present invention, wherein the movable terminal 3 and the static terminal 4 are in an electrical contact state.

As shown in FIGS. 1-4 and 6-10, the movable terminal 3 includes a fixed terminal 31, a movable elastic piece 32, and a movable contact 33. The fixed terminal 31 is fixed to the insulator 20 and is positioned against the left or right side of the partition plate 23. The movable elastic piece 32 includes a fixed end 321 fixed to the upper end of the fixed terminal 31 and a cantilever portion 320 extending downward from the fixed end 321. The movable contact 33 is fixed to the free end of the cantilever portion 320 and protrudes towards the static contact 43 on the static terminal 4. The front side of the partition plate 23 protrudes forward for a predetermined distance relative to the fixed terminal 31, and the top surface of the rib 111 is positioned against the front side of the fixed terminal 31.

In the illustrated embodiment, the insulator 20 has a bottom plate 21, a top plate 22, a left side plate, a right side plate, and a rear side plate 24 that surround the inner cavity. The partition plate 23 divides the inner cavity of the insulator 20 into the plurality of chambers 201. The rear side of the fixed terminal 31 is against the rear side plate 24 of the insulator 20, so that the fixed terminal 31 is fixed between the rib 111 and the rear side plate 24 in the front-rear direction. The lower portion of the rear side plate 24 of the insulator 20 is opened, and the outer side of the rear side plate 24 is arranged against the inner wall surface of the rear sidewall 12 of the housing 10 to electrically isolate the adjacent two chambers 201 from each other.

The static terminal 4 includes a terminal body 42 and a static contact 43. The terminal body 42 is fixed to the insulator 20. The static contact 43 is fixed to one end of the terminal body 42 and faces the movable contact 33. The movable elastic piece 32 is adapted to be moved between the closed position and the opened position. As shown in FIG.

10, when the movable elastic piece 32 is moved to the closed position, the movable contact 33 is in electrical contact with the static contact 43. As shown in FIGS. 7 and 8, when the movable elastic piece 32 is moved to the opened position, the movable contact 33 is electrically separated from the static contact 43.

The insulator 20 has a fixed portion 231 located in the chamber 201. The fixed portion 231 is positioned opposite to the free end of the cantilever portion 320 of the movable elastic piece 32. The terminal body 42 of the static terminal 4 is fixed to the fixed portion 231 of the insulator 20.

Still referring to FIGS. 1-4 and 6-10, the upper end of the fixed terminal 31 is U-shaped. The fixed terminal 31 includes a main body 310, a first connecting portion 311, and a second connecting portion 312. The main body 310 extends in the height direction. The first connecting portion 311 extends in the left-right direction, and one end of the first connecting portion 311 is connected to the upper end of the main body 310. The second connecting portion 312 extends downward in the height direction. One end of the second connecting portion 312 is connected to the other end of the first connecting portion 311. The upper end of the main body 310, the first connecting portion 311, and the second connecting portion 312 constitute the U-shaped upper end of the fixed terminal 31. The fixed end 321 of the movable elastic piece 32 is fixed to the second connecting portion 312 of the fixed terminal 31.

The cantilever portion 320 of the movable elastic piece 32 has at least one bending or bent portion 323 to increase the elasticity of the cantilever portion 320 of the movable elastic piece 32 and reduce the spacing between the cantilever portion 320 of the movable elastic piece 32 and the main body 310 of the fixed terminal 31. In addition, the bending portion 323 can also increase the total length of the cantilever portion 320 of the movable elastic piece 32, thereby increasing the effective length of the movable elastic piece 32. As the spacing between the cantilever portion 320 of the movable elastic piece 32 and the main body 310 of the fixed terminal 31 decreases, and the effective length of the movable elastic piece 32 increases. This arrangement increases the electrical force generated by the opposite currents between the movable elastic piece 32 and the fixed terminal 31, thereby more reliably ensuring that the movable contact 33 does not rebound and open when in the closed position. In the illustrated embodiment, the bent portion 323 is in an arc shape protruding toward the main body 310 of the fixed terminal 31. The movable terminal 3 includes a plurality of movable elastic pieces 32' and 32" stacked together.

The movable elastic piece 32 includes a first movable elastic piece 32' and a second movable elastic piece 32" stacked together. The fixed ends 321' and 321" of the first and second movable elastic pieces 32' and 32" are fixed to the fixed terminal 31. The free ends of the first and second movable elastic pieces 32' and 32' are fixed together by the movable contact 33.

The first movable elastic piece 32' is closer to the main body 310 of the fixed terminal 31 than the second movable elastic piece 32'. The bending portions 321' and 321" of the first and second movable elastic pieces 32' and 32" are in an arc shape protruding toward the main body 310 of the fixed terminal 31. The radius of the bending portion 321' of the first movable elastic piece 32' is larger than that of the bending portion 321" of the second movable elastic piece 32". The bending portion 321" of the second movable elastic piece 32" is accommodated in the bending portion 321' of the first movable elastic piece 32'.

The fixed end 321 of the movable elastic piece 32 can be riveted or welded to the upper end of the fixed terminal 31. The movable contact 33 can be riveted or welded to the free end of the movable elastic piece 32 and protrude towards the static contact 43 of the static terminal 4. The static contact 43 of the static terminal 4 can be riveted or welded to one end of the terminal body 42 of the static terminal 4.

In the exemplary embodiment, the lower ends 313 and 423 of the main body 310 of the fixed terminal 31 and the terminal body 42 of the static terminal 4 pass through the bottom plate 21 of the insulator 20 and are exposed through the bottom opening of the housing 10 to be electrically connected to an external circuit (not shown).

Figure 5:
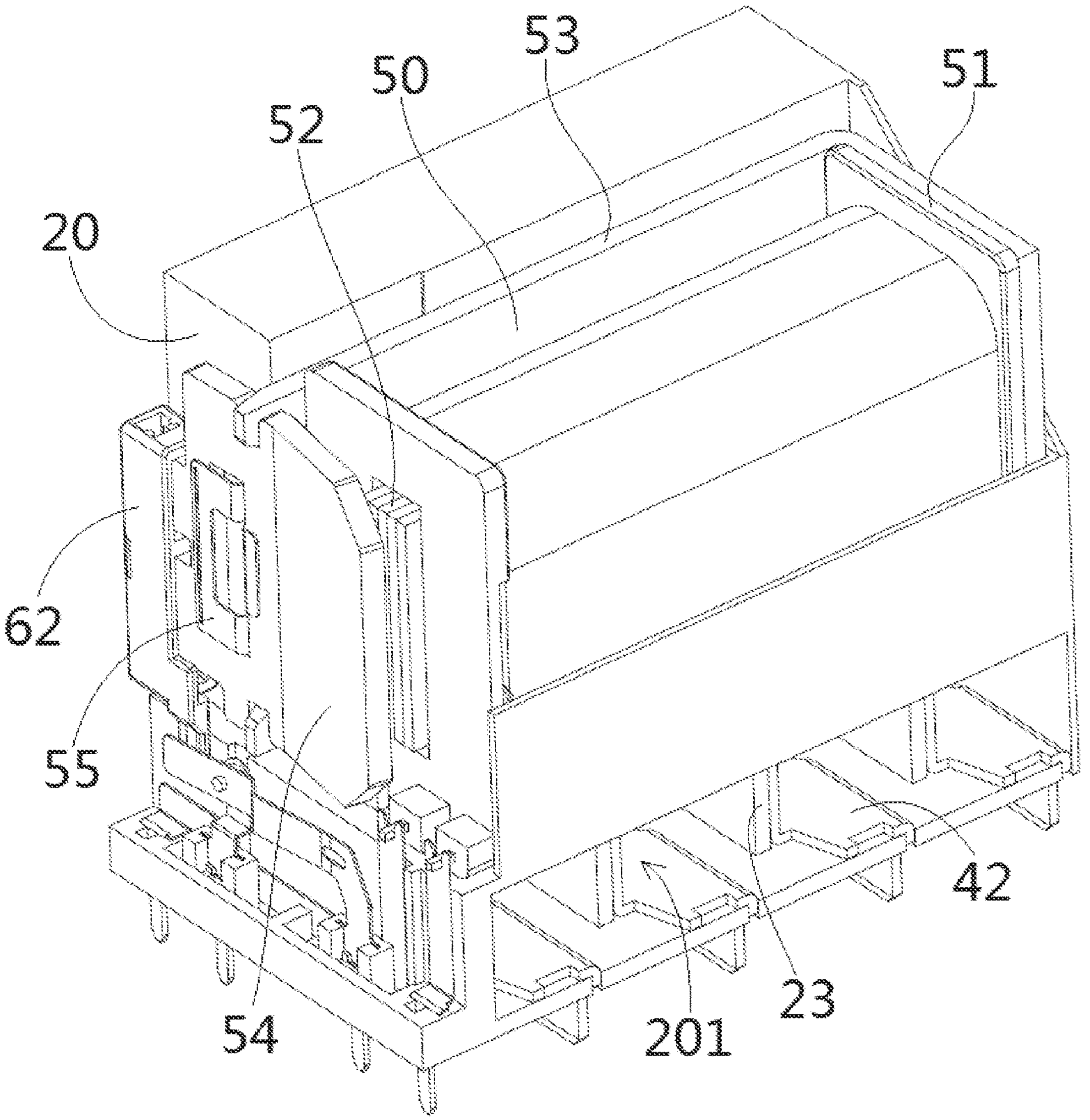
FIG. 5 shows an illustrative perspective view of an electromagnetic relay according to an exemplary embodiment of the present invention when viewed from the rear, with the housing removed.

FIG. 5 shows an illustrative perspective view of an electromagnetic relay according to an exemplary embodiment of the present invention when viewed from the rear, with the housing 10 removed.

As shown in FIGS. 1 to 10, in the illustrated embodiment, the electromagnetic relay further includes a drive device, which is housed in the housing 10 and mounted on the insulator 20, and is used to drive the movable elastic piece 32 of the movable terminal 3 to move between the closed position and the opened position. The drive device comprises a coil bobbin 51 fixed to an insulator 20 and a coil 50 wound around the coil bobbin 51. The drive device further includes a magnetic core 52 housed in the coil bobbin 51 and passing through the coil 50, and a yoke 53 fixed to the coil bobbin 51 and connected to one end of the magnetic core 52. An armature 54 of the drive device is movably mounted on the yoke 53, and faces the other end of the magnetic core 52. The armature 54 is adapted to rotate between an initial position and a termination position. A connection spring piece 55 elastically connects the armature 54 to the yoke 53. Finally, a push member 60 of the device is movably mounted on the insulator 20 and connected to the armature 54.

As shown, when the coil 50 is energized, the armature 54 is moved to the termination position under the action of electromagnetic force to simultaneously drive multiple movable elastic pieces 32 to the closed position through the push member 60. When the coil 50 deenergized, the electromagnetic force disappears, and the armature 54 is rotated to the initial position under the elastic restoring force of the connection spring piece 55 to simultaneously drive multiple movable elastic pieces 32 to the opened position through the push member 60.

The push member 60 includes a push rod 61 that is movably mounted on the insulator 20. The push member further includes a plurality of push portions 63 which are connected to the push rod 61 and are respectively formed with slots that allow the movable elastic pieces 32 to pass through. A connecting portion 62 of the push member 60 is located at one end of the push rod 61 and is rotationally connected to the armature 54.

As shown in FIGS. 1 to 10, in the illustrated embodiment, a notch 23*a* is formed on the front side of the partition plate 23 of the insulator 20. The push rod 61 passes through the notch 23*a* on the partition plate 23 and is limited in the notch 23*a* by a stopper 64 connected to the partition plate 23 to prevent the push rod 61 from falling off the insulator 20.

Figure 11:
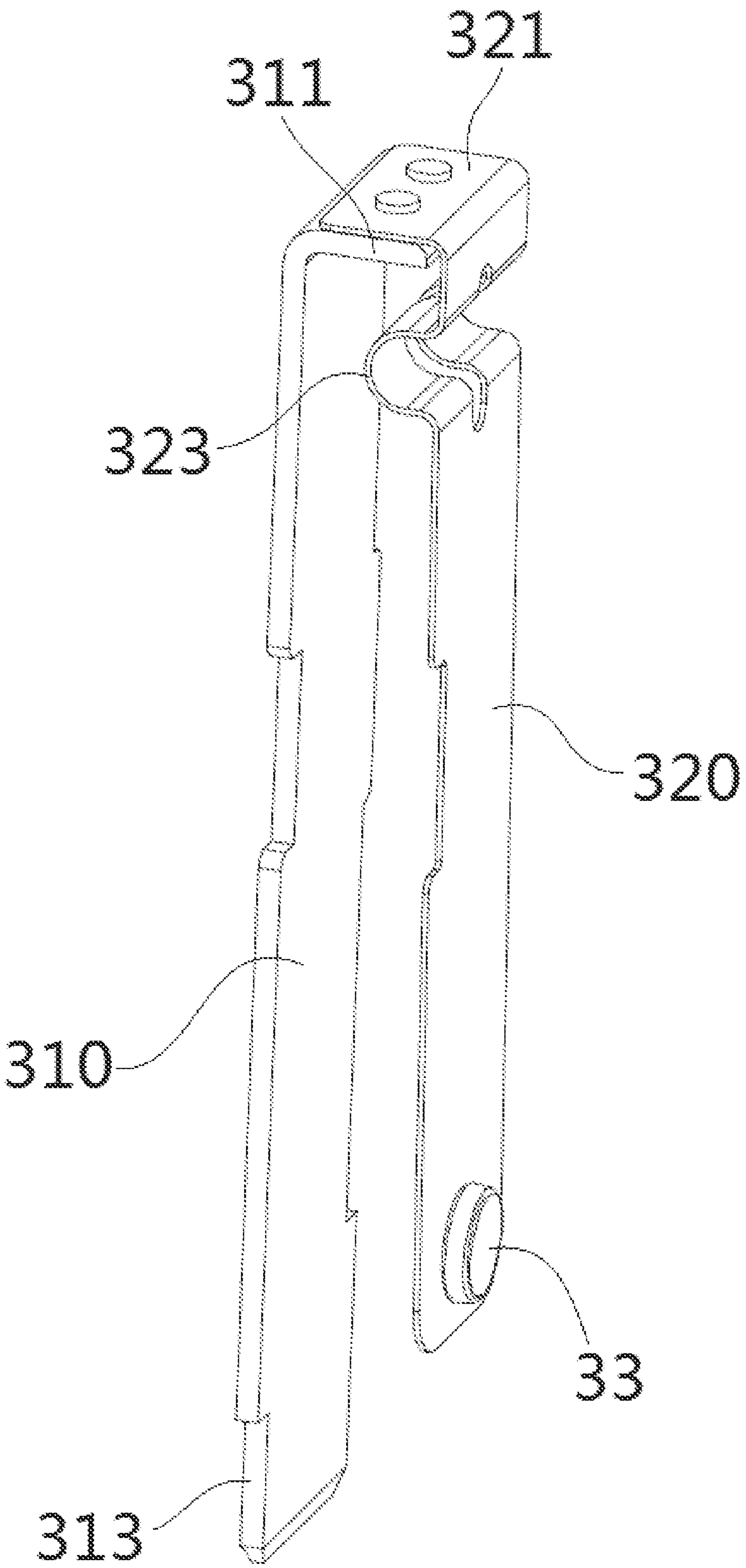
FIG. 11 shows an illustrative perspective view of a movable terminal of an electromagnetic relay according to another exemplary embodiment of the present invention.

FIG. 11 shows an illustrative perspective view of a movable terminal 3 of an electromagnetic relay according to another exemplary embodiment of the present invention. The movable terminal 3 includes a single movable elastic piece 32. In the exemplary embodiment, the upper end of the fixed terminal 31 of the movable terminal 3 is L-shaped. The fixed terminal 31 includes a main body 310 extending in the height direction, and a first connecting portion 311. One end of the first connecting portion 311 is connected to the upper end of the main body 310 and extends in the left-right direction. The upper end of the main body 310 and the first connecting portion 311 form the L-shaped upper end of the fixed terminal 31. The movable elastic piece 32 includes a fixed end 321 and a cantilever portion 320. The fixed end 321 of the movable elastic piece 32 is bent vertically relative to the cantilever portion 320 and is fixed to the first connecting portion 311 of the main body 310. The cantilever portion 320 extends from the fixed end 321 in the height direction. The bent portion 323 on the cantilever portion 320 is formed in an arc shape protruding toward the main body 310 of the fixed terminal 31. The movable contact 33 is riveted to the free end of the cantilever portion 320.

Figure 12:
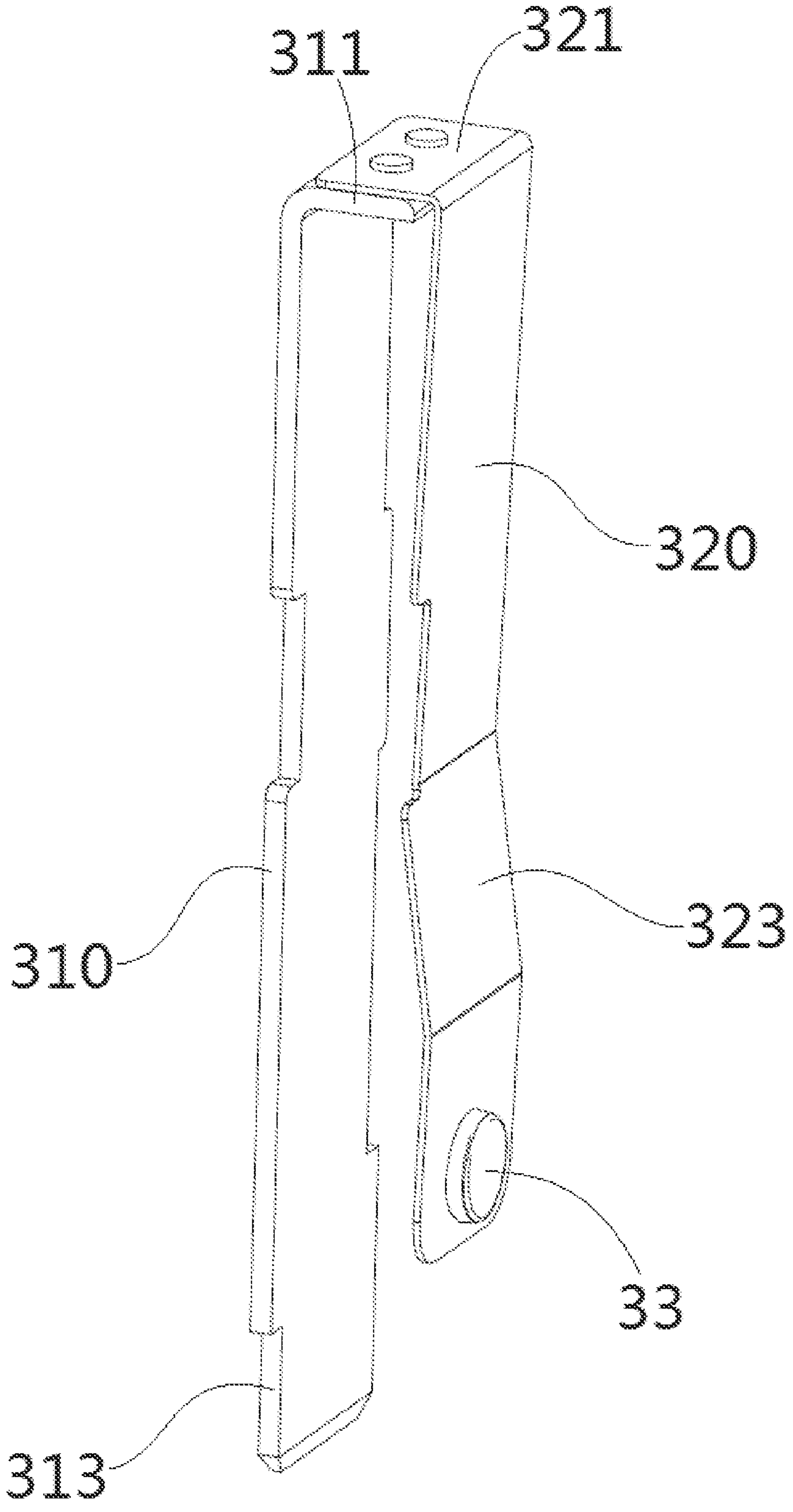
FIG. 12 shows an illustrative perspective view of a movable terminal of an electromagnetic relay according to another exemplary embodiment of the present invention.

FIG. 12 shows an illustrative perspective view of a movable terminal 3 of an electromagnetic relay according to another exemplary embodiment of the present invention. As shown in FIG. 12, the movable terminal 3 includes a single movable elastic piece 32, and the upper end of the fixed terminal 31 of the movable terminal 3 is L-shaped. In the illustrated embodiment, the fixed terminal 31 includes a main body 310 extending in the height direction; and a first connecting portion 311, one end of which is connected to the upper end of the main body 310 and extends in the left-right direction. The upper end of the main body 310 and the first connecting portion 311 form the L-shaped upper end of the fixed terminal 31. The movable elastic piece 32 includes a fixed end 321 and a cantilever portion 320. The fixed end 321 of the movable elastic piece 32 is bent vertically relative to the cantilever portion 320 and fixed to the first connecting portion 311 of the main body 310. The cantilever portion 320 extends from the fixed end 321 in the height direction. The bent portion 323 on the cantilever portion 320 is in a slope shape that extends obliquely towards the main body 310 of the fixed terminal 31. The movable contact 33 is riveted to the free end of the cantilever portion 320.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electromagnetic relay, comprising:

a housing having a top wall and a bottom opening that are opposite in a height direction, a front sidewall and a rear sidewall that are opposite in a front and rear direction, and a left sidewall and a right sidewall that are opposite in a left-right direction;

an insulator housed in the housing and formed with a plurality of chambers which are opened towards the front sidewall of the housing and are arranged in a row along the left-right direction, the insulator including a partition plate located between two adjacent chambers, a notch is formed on a front side of the partition plate;

a plurality of static terminals fixedly installed in the plurality of chambers of the insulator;

a plurality of movable terminals which are respectively installed in the plurality of chambers for electrical contact with the plurality of static terminals, each movable terminal has a movable elastic piece and a movable contact; and a driving device, the driving device drives each movable elastic piece to move between a closed position where each movable contact is in electrical contact with one static contact and an opened position where each movable contact is electrically separated from each static contact, the driving device has a coil bobbin fixed to the insulator, a coil wound around the coil bobbin, a yoke fixed to the coil bobbin, an armature movably mounted on the yoke, and a push member movably mounted on the insulator and connected to the armature, the push member includes a push rod movably mounted on the insulator, the push rod passes through the notch on the partition plate and is limited in the notch by a stopper connected to the partition plate, when the coil is energized, the armature is moved to a termination position under the action of electromagnetic force to simultaneously drive the plurality of movable elastic pieces to the closed position through the push member.

2. The electromagnetic relay according to claim 1, wherein a rib is formed on an inner wall surface of the front sidewall of the housing, the front side of the partition plate is arranged against the inner wall surface of the front sidewall of the housing, and a side of the rib is arranged against a left or a right side of the partition plate to electrically isolate the adjacent two chambers from each other.

3. The electromagnetic relay according to claim 2, wherein each movable terminal includes:

a fixed terminal attached to the insulator and arranged against the left or right side of the partition plate;

the movable elastic piece having a fixed end attached to an upper end of the fixed terminal and a cantilever portion extending downward from the fixed end; and the movable contact fixed to a free end of the cantilever portion, the front side of the partition plate protrudes forward a predetermined distance relative to the fixed terminal, and a top surface of the rib is positioned against a front side of the fixed terminal.

4. The electromagnetic relay according to claim 3, wherein the insulator has a bottom plate, a top plate, a left side plate, a right side plate, and a rear side plate that surround an inner cavity, and the partition plate separates the inner cavity of the insulator into the plurality of chambers, and the rear side of the fixed terminal is arranged against the rear side plate of the insulator securing the fixed terminal between the rib and the rear side plate in the front-rear direction.

5. The electromagnetic relay according to claim 4, wherein a lower part of the rear side plate of the insulator is opened, and an outer side of the rear side plate is arranged against an inner wall surface of the rear sidewall of the housing to electrically isolate the adjacent two chambers from each other.

6. The electromagnetic relay according to claim 3, wherein the static terminal includes:

a terminal body fixed to the insulator; and a static contact fixed to one end of the terminal body and facing the movable contact.

7. The electromagnetic relay according to claim 6, wherein the insulator has a fixed portion arranged in the chamber and facing the free end of the cantilever portion of the movable elastic piece, and the terminal body of the static terminal is fixed to the fixed portion of the insulator.

8. The electromagnetic relay according to claim 6, wherein:

the fixed end of the movable elastic piece is riveted or welded to the upper end of the fixed terminal;

the movable contact is riveted or welded to the free end of the movable elastic piece and protrudes towards the static contact of the static terminal; and the static contact of the static terminal is riveted or welded to one end of the terminal body of the static terminal.

9. The electromagnetic relay according to claim 6, wherein lower ends of a main body of the fixed terminal and the terminal body of the static terminal pass through the bottom plate of the insulator and are exposed through the bottom opening of the housing.

10. The electromagnetic relay according to claim 6, wherein the driving device is arranged in the housing and mounted on the insulator.

11. The electromagnetic relay according to claim 10, wherein the driving device includes:

a magnetic core housed in the coil bobbin and passing through the coil;

the yoke connected to one end of the magnetic core;

the armature facing the other end of the magnetic core, the armature is adapted to rotate between an initial position and the termination position; and a connection spring piece elastically connecting the armature to the yoke, when the coil is deenergized, the armature is rotated to the initial position under an elastic restoring force of the connection spring piece to simultaneously drive the plurality of movable elastic pieces to the opened position through the push member.

12. The electromagnetic relay according to claim 11, wherein the push member includes:

a plurality of push portions connected to the push rod and respectively formed with slots that allow the movable elastic pieces to pass through; and a connecting portion positioned at one end of the push rod and rotationally connected to the armature.

13. The electromagnetic relay according to claim 3, wherein the upper end of the fixed terminal is U-shaped, and the fixed terminal includes:

a main body extending in the height direction;

a first connecting portion extending in the left-right direction; and a second connecting portion extending downward in the height direction, wherein:

one end of the first connecting portion is connected to an upper end of the main body, one end of the second connecting portion is connected to the other end of the first connecting portion;

the upper end of the main body, the first connecting portion, and the second connecting portion define the U-shaped upper end of the fixed terminal, and the fixed end of the movable elastic piece is fixed to the second connecting portion of the fixed terminal.

14. The electromagnetic relay according to claim 3, wherein the upper end of the fixed terminal is L-shaped, and the fixed terminal includes:

a main body extending in the height direction; and a first connecting portion having one end connected to the upper end of the main body and extending in the left-right direction, the upper end of the main body and the first connecting portion define the L-shaped upper end of the fixed terminal, and the fixed end of the movable elastic piece is fixed to the first connecting portion of the fixed terminal.

15. The electromagnetic relay according to claim 14, wherein the cantilever portion of the movable elastic piece has at least one bent portion increasing the elasticity of the cantilever portion of the movable elastic piece and reducing the spacing between the cantilever portion of the movable elastic piece and the main body of the fixed terminal.

16. The electromagnetic relay according to claim 15, wherein the bent portion defines an arc shape protruding toward the main body of the fixed terminal, or defines a slope shape extending obliquely toward the main body of the fixed terminal.

17. The electromagnetic relay according to claim 15, wherein the movable terminal comprises a single movable elastic piece, or the movable terminal comprises a plurality of movable elastic pieces stacked together.

18. The electromagnetic relay according to claim 15, wherein:

the movable elastic piece includes a first movable elastic piece and a second movable elastic piece stacked together;

the fixed ends of the first movable elastic piece and the second movable elastic piece are fixed to the fixed terminal; and free ends of the first movable elastic piece and the second movable elastic piece are fixed together by the movable contact.

19. The electromagnetic relay according to claim 18, wherein:

the first movable elastic piece is closer to the main body of the fixed terminal than the second movable elastic piece;

the bent portions of the first movable elastic piece and the second movable elastic piece define an arc shape protruding toward the main body of the fixed terminal; and a radius of the bending portion of the first movable elastic piece is larger than a radius of the bending portion of the second movable elastic piece, the bending portion of the second movable elastic piece is accommodated within the bending portion of the first movable elastic piece.

* * * * *